No. 706,160. Patented Aug. 5, 1902.
M. CHRISTIANSON.
PLANT GUARD ATTACHMENT FOR CULTIVATORS.
(Application filed Mar. 8, 1902.)
(No Model.)
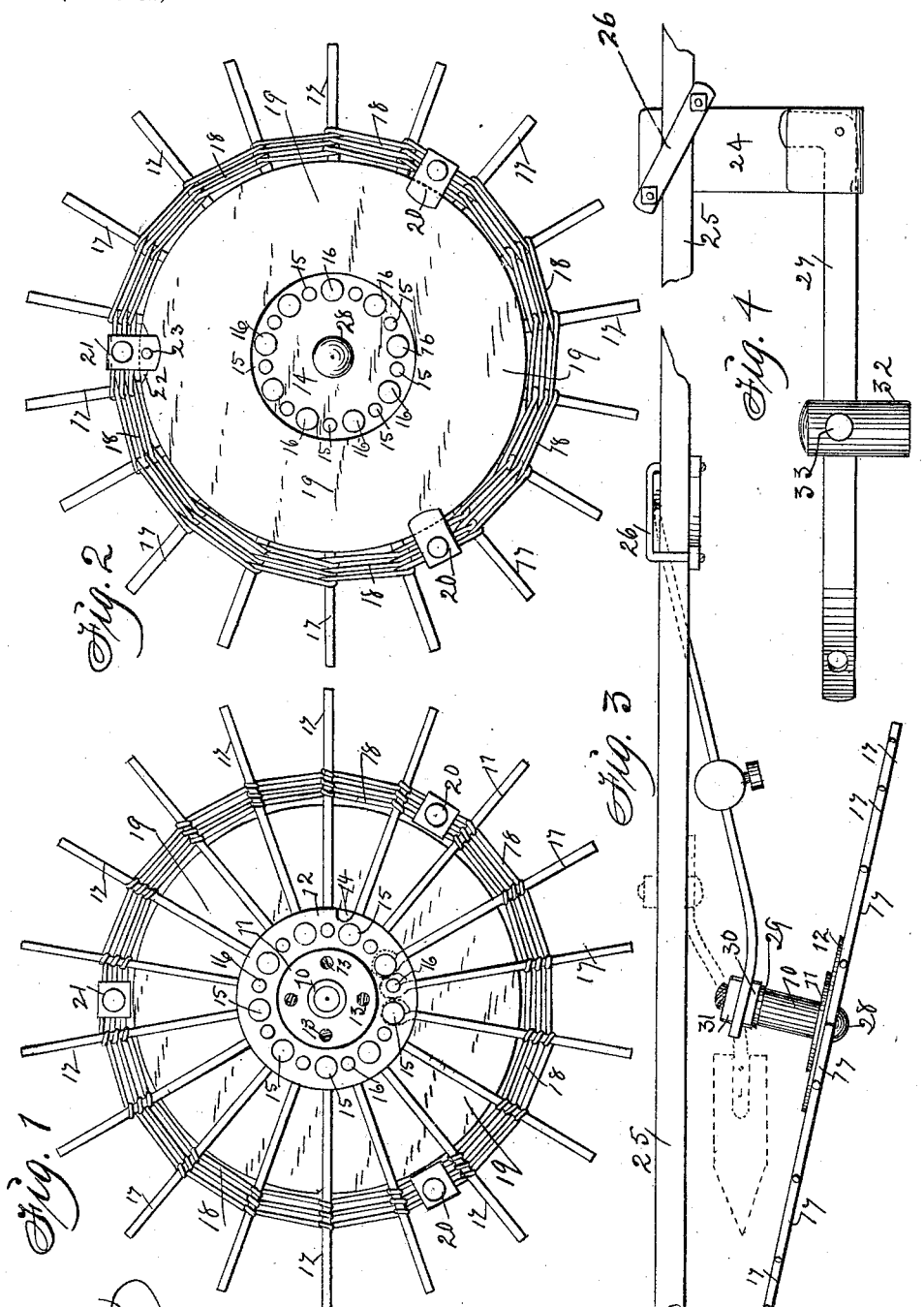
Witnesses:
Henry Mangez.
R. S. Orwig.
Inventor: Martin Christianson,
By Thomas G. Orwig, Attorney.

UNITED STATES PATENT OFFICE.

MARTIN CHRISTIANSON, OF BODE, IOWA.

PLANT-GUARD ATTACHMENT FOR CULTIVATORS.

SPECIFICATION forming part of Letters Patent No. 706,160, dated August 5, 1902.

Application filed March 8, 1902. Serial No. 97,327. (No model.)

*To all whom it may concern:*

Be it known that I, MARTIN CHRISTIANSON, a citizen of the United States, residing at Bode, in the county of Humboldt and State of Iowa, have invented a new and useful Plant-Guard Attachment for Cultivators, of which the following is a specification.

My object is to protect plants from being injured by clods, rubbish, or loose ground being thrown upon them as the shovel of a cultivator is advanced in the ground alongside of a row of plants, to make the ground fine, and to distribute loose pulverized soil to the plants, to aid in keeping the shovel clean, and to allow the cultivator to be advanced at a greater rate of speed than usual.

My invention consists in the construction, arrangement, and combination of a rotatable plant-guard and ground pulverizer and distributer and means for regulating its penetration into the ground in combination with the beam and shovel of a cultivator, as hereinafter set forth, pointed out in my claims, and illustrated in the accompanying drawings, in which—

Figure 1 is a full view of the side of the guard that is to be nearest the shovel when in operation. Fig. 2 shows the reverse side that is to be nearest the plant and shows how a circular shield is detachably connected with the rotatable guard. Figs. 3 and 4 show how the rotatable plant-guard is detachably and adjustably connected with a circular beam.

10 designates a tubular hub that has an integral flange 11, to which is fixed a disk 12 by means of rivets 13. A second disk 14 is rigidly fixed to the disk 12 by means of rivets 15 and 16, and a plurality of straight metal spokes 17, made of heavy wire or light round rods provided with eyes at their inner ends, are clamped fast between the disks 12 and 14 and the two series of rivets 15 and 16, as shown in Figs. 1 and 2. Dotted lines in Fig. 1 indicate how the rivets are extended through the eyes on the inner end of the spokes that are thus rigidly fixed to the hub to extend radially and rotate in a vertical plane when in operation.

To stiffen the spokes and to retain them in alinement, a wire is woven to them to produce a rigid rim or circular band 18 at some distance from the ends of the spokes, so each spoke can penetrate the ground when the cultivator is advanced alongside of a row of plants, as required to rotate the plant-guard and loosen and pulverize the soil.

To limit the amount of loose ground that is allowed to pass through between the spokes of the plant-guard, a circular sheet-metal disk 19 is detachably fastened to the guard by means of metal clips 20, riveted to the wire band 18, and a turn-button 21, pivoted to the same band, as shown in Fig. 2. A notch 22 in the circumference of the disk and a stud 23 on the turn-button facilitate the fastening and unfastening of the disk 19.

24 is a metal upright adapted to be clamped fast to a cultivator-beam 25 by means of a yoke 26, as shown in Figs. 3 and 4. The lower end of the upright is doubled upward, and between the parallel parts of the upright thus produced the rear elbow-shaped end of a guard-bearer 27 is pivoted in such a manner that it will have free upward motion, but no downward motion. This bearer is made of a flat metal bar and curved laterally at its free front end, as shown in Fig. 3, in such a manner that the rotatable guard connected therewith will be retained in an inclined position relative to the beam and the line of advance.

A bolt 28 is extended through the hub 10 and fastened to the front end of the bearer 27 by means of a washer 29 and nuts 30 and 31 or in any suitable way, so that the bolt will serve as an axle upon which the plant-guard can rotate as the cultivator is advanced. A weight 33 is slidingly connected with the bearer 27 in such a manner that it can be moved backward and forward and clamped at any point desired as a means for regulating the depth of the free ends of the spokes 17 as they successively penetrate the ground.

In the practical use of my invention thus connected and applied only fine ground is allowed to pass outward between the spokes to lodge around plants. To limit the amount of ground that is to pass toward the plants when they are small, the circular disk 19 is retained on the guard. When the plants are large, the disk can be removed to allow more loose soil to pass outward and to fall around the plants.

Having thus described the construction and function of each part and their arrangement in combination, the practical operation and utility of my invention will be readily understood by persons familiar with the art to which it pertains, and

What I claim as new, and desire to secure by Letters Patent, is—

1. A rotatable plant-guard consisting of a hub, straight spokes fixed to the hub to extend radially, a disk fixed to the inner end of the spoke and hub, and a rim fixed to the spokes at some distance from their outer ends, in combination with a bearer adapted to be fixed to the beams of a cultivator, to operate in the manner set forth, for the purposes stated.

2. A rotatable plant-guard, composed of a hub having an integral flange at one end, a disk fixed to said flange, a second disk placed against the end of the hub, a plurality of straight spokes provided with eyes at their inner ends, fixed between the two disks by means of rivets to extend radially and a band fixed to the outer end portions of the spokes, for the purposes stated.

3. A rotatable plant-guard, composed of a hub having an integral flange at one end, and a disk fixed to the said flange, a second disk placed against the end of the hub, a plurality of straight spokes provided with eyes at their inner ends fixed between the two disks, by means of rivets, to extend radially, and a band fixed to the outer portion of the spokes, and a disk detachably fastened to the spokes and rim, arranged and combined to operate in the manner set forth, for the purposes stated.

4. A rotatable plant-guard, consisting of a hub, straight spokes extending radially from the hub, a rim or band connecting the outer end portions of the spokes, clips fixed to the band, a disk connected with the said clips, and means for detachably fastening the disk to the spokes and rim, in combination with a bearer attached to a cultivator-beam, to operate in the manner set forth, for the purposes stated.

5. A plant-guard bearer, consisting of an upright, adapted to be detachably fastened to a cultivator-beam, a bar adapted to carry a rotatable plant-guard pivotally connected with the lower end of said upright to extend horizontally and to have an upward motion but no downward motion, and a weight adjustably connected with said bar, and a rotatable plant-guard attached to the front free end of said bar, arranged and combined to operate in the manner set forth, for the purposes stated.

6. A plant-guard and ground pulverizer and distributer comprising a rotatable guard having spokes extending radially, a fixed band or rim fixed to the inner end portions of the rim, a disk detachably fastened to the spokes and said rim, an upright adapted to be fastened to a plow-beam, and its lower end doubled upward, a bar, elbow-shaped at its rear end, pivoted between the double part of said upright and its front end inclined laterally to support and carry the rotatable plant-guard, and a weight adjustably connected with said bar, arranged and combined to operate in the manner set forth, for the purposes stated.

MARTIN CHRISTIANSON.

Witnesses:
ASHER O. NASBY,
T. O. HANSON.